(12) United States Patent
So et al.

(10) Patent No.: US 8,320,673 B2
(45) Date of Patent: Nov. 27, 2012

(54) IMAGE PROCESSING APPARATUS, IMAGE PROCESSING METHOD AND COMPUTER-READABLE MEDIUM

(75) Inventors: Ikken So, Kanagawa (JP); Shunichi Kimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 790 days.

(21) Appl. No.: 12/511,741

(22) Filed: Jul. 29, 2009

(65) Prior Publication Data

US 2010/0226588 A1    Sep. 9, 2010

(30) Foreign Application Priority Data

Mar. 3, 2009    (JP) ................. 2009-048812

(51) Int. Cl.
*G06K 9/34* (2006.01)
*G06K 9/36* (2006.01)

(52) U.S. Cl. ................. 382/173; 382/237

(58) Field of Classification Search ........... 382/173, 382/176–177, 232–251, 162, 165–166, 274–275, 382/178; 358/1.9, 3.24, 3.26, 2.1, 518
See application file for complete search history.

(56) References Cited

U.S. PATENT DOCUMENTS

| | | | |
|---|---|---|---|
| 6,023,526 A * | 2/2000 | Kondo et al. | 382/165 |
| 6,404,917 B1 * | 6/2002 | Kondo et al. | 382/166 |
| 6,404,919 B1 * | 6/2002 | Nishigaki et al. | 382/176 |
| 6,636,630 B1 * | 10/2003 | Adachi et al. | 382/176 |
| 6,898,329 B1 * | 5/2005 | Takahashi | 382/272 |
| 7,471,839 B2 * | 12/2008 | Moreira | 382/240 |
| 7,567,709 B2 * | 7/2009 | Lim et al. | 382/176 |
| 7,783,117 B2 * | 8/2010 | Liu et al. | 382/232 |
| 8,155,437 B2 * | 4/2012 | Gross et al. | 382/166 |
| 8,159,722 B2 * | 4/2012 | Higashiyama et al. | 358/3.26 |

FOREIGN PATENT DOCUMENTS

| | | |
|---|---|---|
| JP | A-5-62013 | 3/1993 |
| JP | A-5-130426 | 5/1993 |
| JP | A-2000-357230 | 12/2000 |
| JP | A-2004-128880 | 4/2004 |
| JP | A-2004-242075 | 8/2004 |
| JP | A-2007-249774 | 9/2007 |
| JP | A-2008-99149 | 4/2008 |

* cited by examiner

*Primary Examiner* — Ishrat I Sherali

(74) *Attorney, Agent, or Firm* — Oliff & Berridge, PLC

(57) ABSTRACT

An image processing apparatus includes a binarization unit, a determination unit and a pixel value calculating unit. The binarization unit binarizes image data. The determination unit determines as to whether or not each pixel of the image data binarized by the binarization unit forms a peripheral portion of a pixel block. The pixel value calculating unit calculates a corrected pixel value of the pixel block based on (i) pixel values of pixels which are determined by the determination unit not to form the peripheral portion of the pixel block and (ii) pixel values of pixels forming the pixel block.

14 Claims, 12 Drawing Sheets

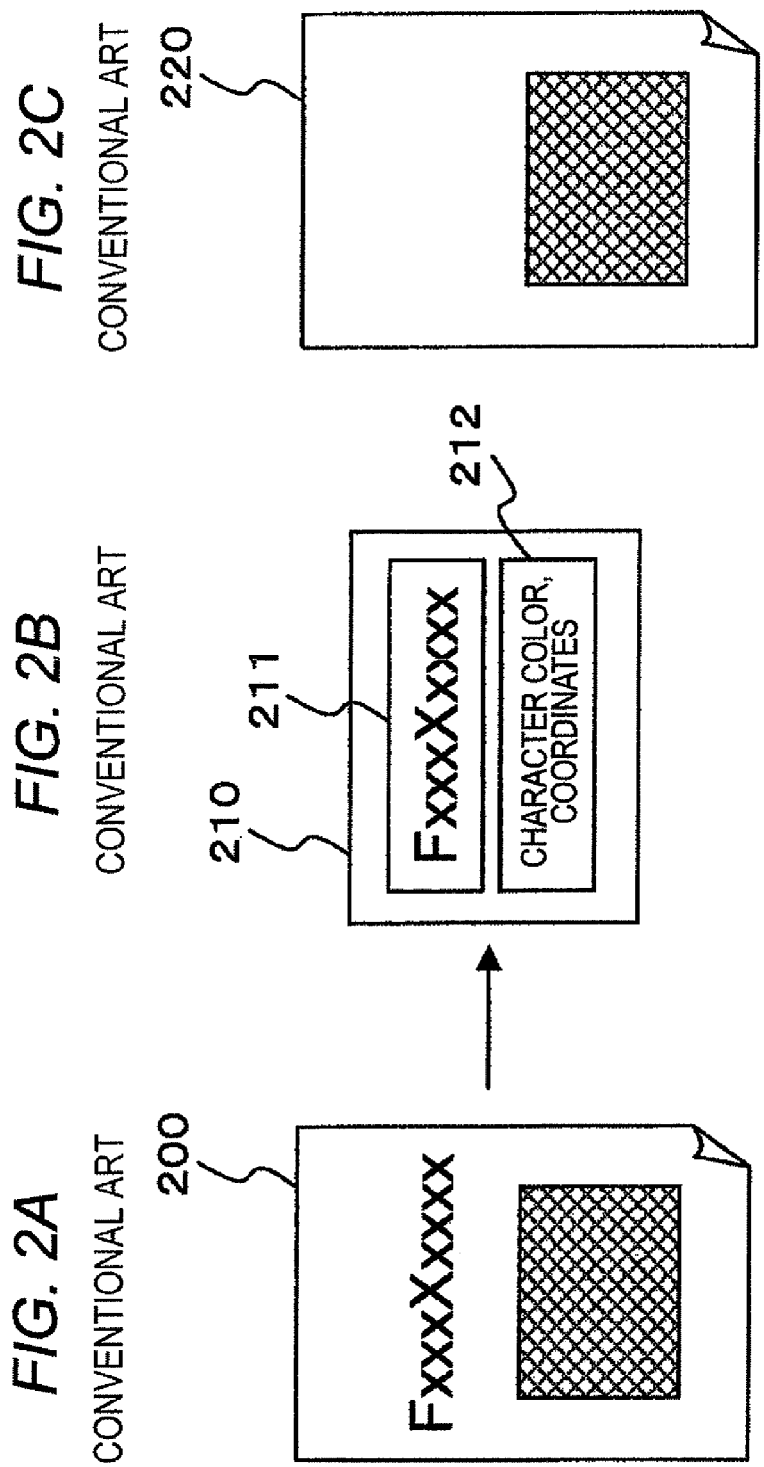

FIG. 3A
CONVENTIONAL ART
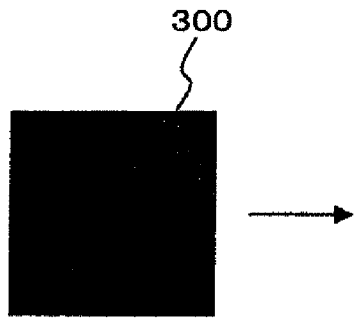
FIG. 3B
CONVENTIONAL ART
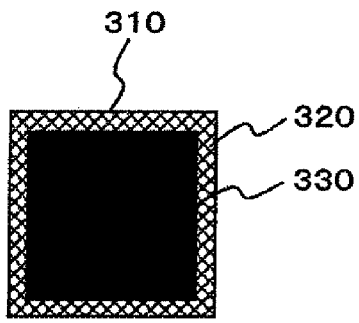
FIG. 4A
CONVENTIONAL ART
FIG. 4B
CONVENTIONAL ART
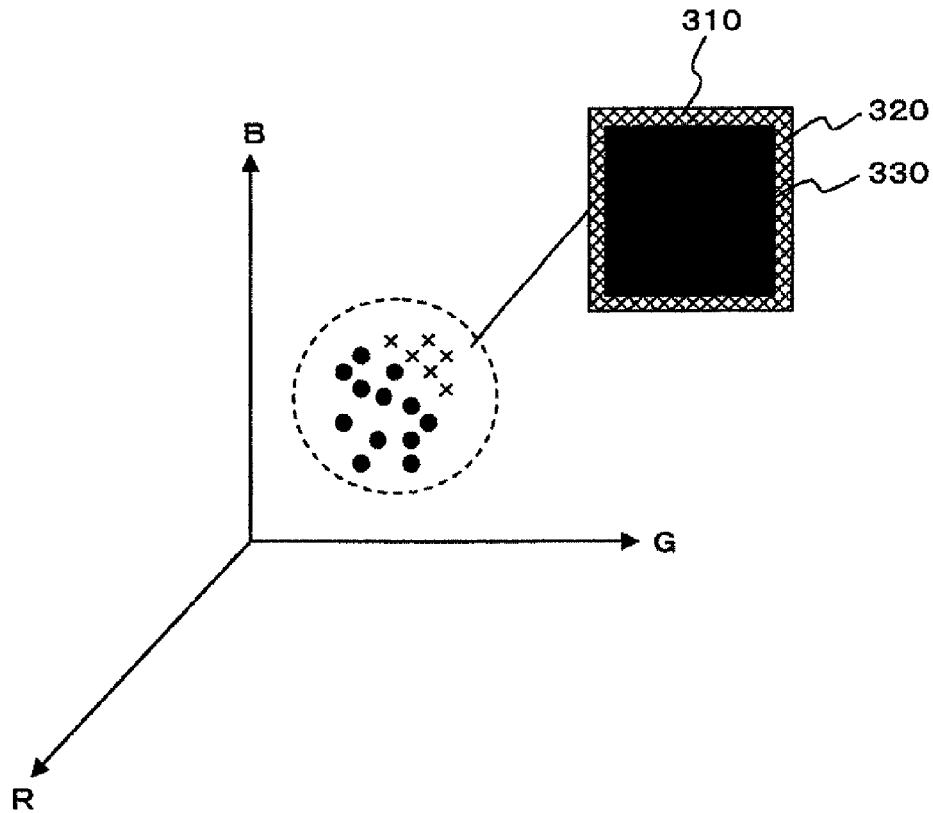

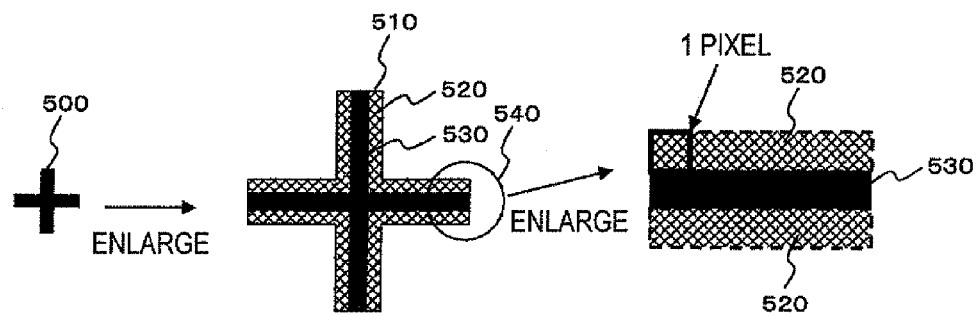
FIG. 5A CONVENTIONAL ART
FIG. 5B CONVENTIONAL ART
FIG. 5C CONVENTIONAL ART
FIG. 6 CONVENTIONAL ART
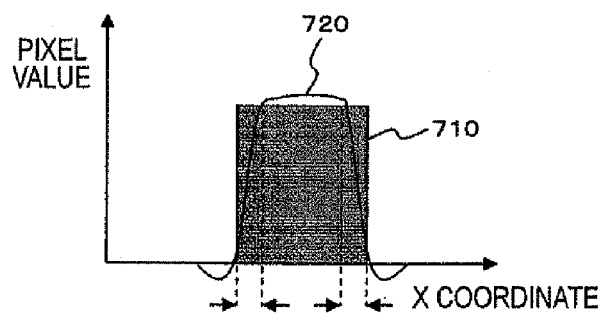
FIG. 7

1700

1800

1900   1910

1920

IMAGE PROCESSING APPARATUS, IMAGE PROCESSING METHOD AND COMPUTER-READABLE MEDIUM

CROSS-REFERENCE TO RELATED APPLICATIONS

This application is based on and claims priority under 35 USC 119 from Japanese Patent Application No. 2009-48812 filed on Mar. 3, 2009.

BACKGROUND

1. Technical Field

The present invention relates to an image processing apparatus, an image processing method and a computer-readable medium storing a program that causes a computer to execute image processing.

2. Related Art

A color scan image is not suitable for storage or transmission because it has the size of tens of megabytes. For this reason, a pixel block including a character, a line image, and the like is handled as a binary image with color information and the like and is subjected to lossless compression, such as MMR (Modified Modified Read), while JPEG (Joint Photographic Experts Group) compression is performed for graphics or a natural image with being handled as a multilevel image. In addition, there is proposed a method of adding an extended character, an extended line image, and the like onto an extended JPEG image using attached color information when reproduced is an image which is compressed by the above-described manner.

In this case, for example, in a character within an image, a color of a peripheral portion of the character may be changed due to deterioration of an MTF (Modulation Transfer Function) caused by scanner reading, a JPEG compression immediately after the scan, and the like. More specifically, a character periphery may be blurred, a background color and a character color may run, or pixels in which a character color changes may occur depending on the parameters of the JPEG compression. In such a case, it has been desired to reproduce an original color.

As the related techniques, for example, JP 2004-128880 A has an object to provide an image compression apparatus, an image extension apparatus, a method thereof, and a program that can generate a good restored image and can perform image compression without degrading a quality of a compressed image. A binarization section binarizes a multilevel image. A region specifying section A specifies a position of a character region within the binary image. A region specifying section B specifies a position of a unit character region within the character region. A representative color portion extracting section extracts a representative color of the unit character region based on position information of the unit character region and the multilevel image. A character region filling section fills the character region with a peripheral color based on the position information of the character region. A reduction section reduces the filled multilevel image. A JPEG compression section compresses the reduced multilevel image. An MMR compression section compresses a partial binary image corresponding to the character region and outputs compression data including the positional information, a compression code generated by each compression section, and representative color information of the unit character region.

Furthermore, for example, JP 2000-357230 A has an object to reduce an error in region division for a boundary edge portion or the like between a background portion and a character portion of a color document image and to improve an accuracy of character extraction and the like. A color image is input through an image input section. A used color specifying section specifies colors to be used. A region creating section creates a region for each of the specified colors to be used. A region color correcting section corrects allocation of a use color to a region in interest based on a positional relationship in color space between a use color allocated to the region in interest and a use color allocated to an adjacent region to the region interest. A character extracting section extracts a character within the color image using information on the region for each use color.

Furthermore, for example, JP Hei. 5-62013 A describes that its most significant feature is to make it possible to easily extract only characters from a three-color printed material in which the characters expressed with a first color are printed while overlapping patterns expressed with second and third colors. In this configuration, a CPU calculates parameters for density conversion based on RGB values of a background color of a material to be read which are input through a data input circuit and RGB values of first and second patterns to be removed which are input through the data input circuit. The calculated parameters are written in advance into a look-up table circuit, and image signals collected from the material to be read are converted into a gradation image in which only the characters are extracted in accordance with the parameters. Then, the obtained image is converted into a binary image in a binarization circuit for output.

Furthermore, for example, JP 2008-99149 A has an object to easily and highly accurately detect colors of characters. An MFP includes: a character region extracting section that extracts a character region with a character attribute, in which a character is expressed, from a color image; a line thinning section that makes a character included in the character region thinner; a character color determining section that determines a character color based on colors of pixels of a color image corresponding to plural character pixels which form a middle of the thinned character; a noise eliminating section that converts the color image into a binary image by binarizing the color image; a character region encoding section that encodes the character region of the binary image and generates code data; and an integration section that associates the generated code data, the determined character color, and the position of the character region in the color image.

Furthermore, for example, JP 2004-242075 A has an object to accurately extract a character color and character region information in a multilevel image by feedback of the color extraction result to character clipping processing. An image processing apparatus includes: character region image generating means for generating a binary image of a character region from a color image; characters clipping means for generating a character rectangle for the binary image of the character region; one-color determination means for performing one-color determination of the character rectangle; means for determining as to whether or not a non-one-color character rectangle is a group of plural kinds of one-color characters; and detailed character clipping means for performing character clipping within the determined rectangle.

Furthermore, for example, JP Hei. 5-130426 A has an object to provide an image processing apparatus capable of highly efficiently encoding and decoding an image. An edge detecting section detects an edge of an image. A first color detecting section detects a predetermined color. A first color character extracting section to which the detection result is input extracts a skeleton portion of a color character. Then, a second color detecting section detects a color around pixels detected as the color character. A second color character extracting section receives a color character attached to the skeleton of the color character extracted by the first color character extracting section according to the result. Then, a thin line detecting section determines it to be a thin line portion of the color character when an edge pixel has a predetermined color. A mixing section mixes it with the color character from the second color character extracting section, and it is finally output as the color character.

Furthermore, for example, JP 2007-249774 A has an object to accurately determine a color of a character expressed by a character image input through a scanner or the like. An image forming apparatus is provided with: a thinned image generating section that detects a middle line of a linear figure of a character expressed in a scan input image and a middle region, which is a region around the middle line, by generating a thinned image of the input image; a character image dividing section that divides the middle region into plural character color candidate regions RC; an approximate color pixel selecting section that detects a pixel, which meets a predetermined condition, among pixels belonging to small regions as an approximate color pixel for each of the small regions; and a character color determining section that determines a color of the character expressed in the input image based on color information of the pixel, meeting the predetermined condition, of each small region.

SUMMARY

According to an aspect of the invention, an image processing apparatus includes a binarization unit, a determination unit and a pixel value calculating unit. The binarization unit binarizes image data. The determination unit determines as to whether or not each pixel of the image data binarized by the binarization unit forms a peripheral portion of a pixel block. The pixel value calculating unit calculates a corrected pixel value of the pixel block based on (i) pixel values of pixels which are determined by the determination unit not to form the peripheral portion of the pixel block and (ii) pixel values of pixels forming the pixel block.

BRIEF DESCRIPTION OF THE DRAWINGS

Exemplary embodiments of the invention will be described in detail below based on the accompanying drawings, wherein:

FIGS. 2A to 2C are explanatory views illustrating examples of image compression;

FIGS. 3A and 3B are explanatory views illustrating examples of an image in which discoloration has occurred;

FIGS. 4A and 4B are explanatory views illustrating examples of extraction of a character color when clustering is used;

FIGS. 5A to 5C are explanatory views illustrating detailed examples of an image in which color change has occurred;

FIG. 6 is an explanatory view illustrating an example of extraction of a character color;

FIG. 7 is an explanatory view illustrating an example of a change in the pixel value caused by reading with a scanner;

DETAILED DESCRIPTION

Figure 1:
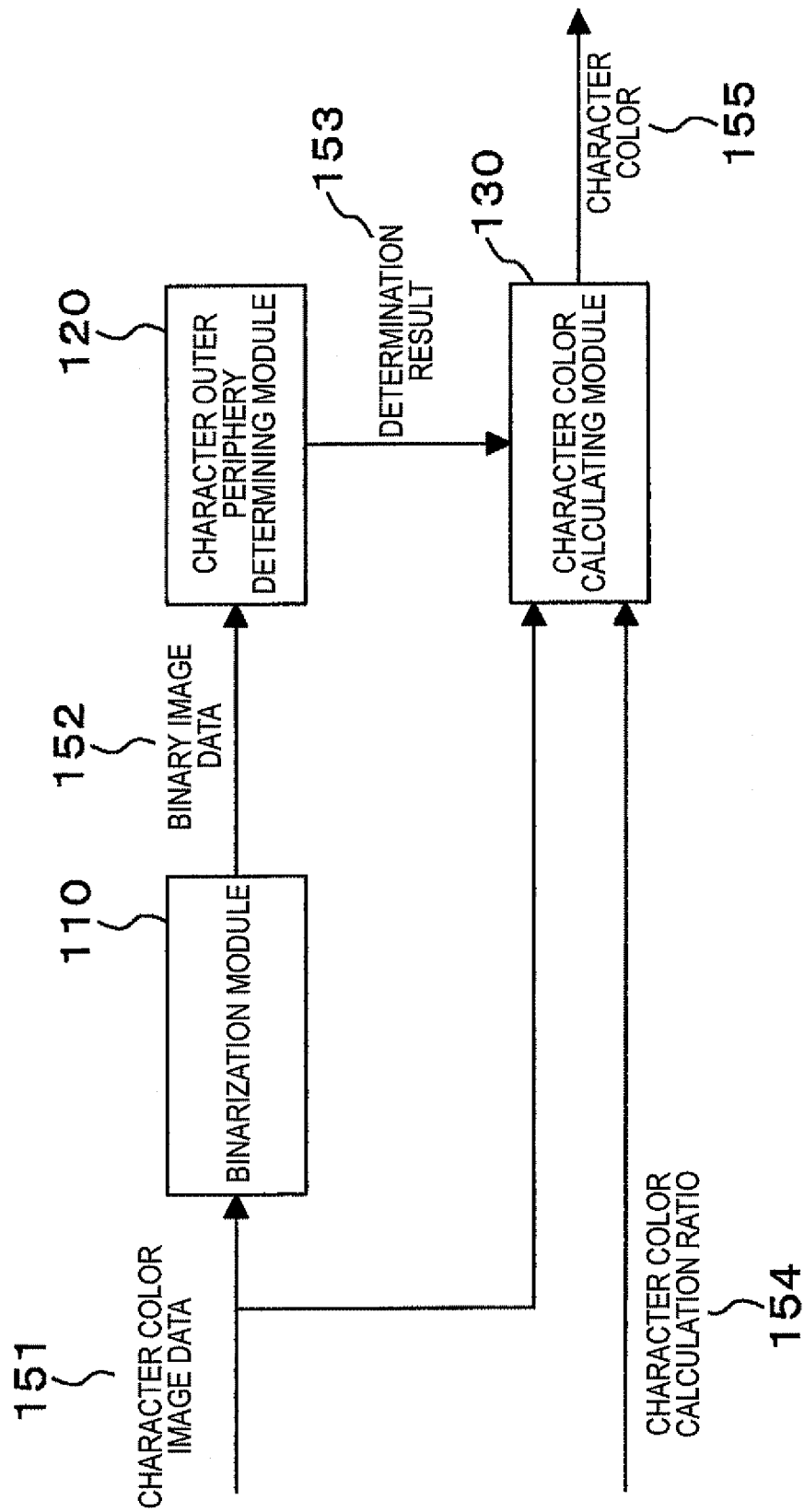
FIG. 1 is a view illustrating the conceptual module configuration in a configuration example of a first exemplary embodiment.

First, techniques related to the exemplary embodiments of the invention will be described with reference to FIGS. 2A to 8.

Examples of a "pixel block" at least include a pixel region in which pixels continue in the four- or eight-connectivity manner, and also include a group of these pixel regions. The group of these pixel regions is, for example, such a group that there are plural pixel regions in which, for example, pixels continue in the four-connectivity manner and the plural pixel regions is in the vicinity of each other. Here, examples of the expression "being in vicinity of each other" include (i) pixel regions which are close to each other in distance, (ii) image regions obtained by projecting in the horizontal or vertical direction so that characters are clipped out one by one from one line of a sentence and then clipping the characters at a blank point and (iii) image regions obtained by clipping out at fixed intervals.

In many cases, one pixel block corresponds to an image of one character. Hereinafter, a "pixel block" may be also called a "character" or a "character image". However, it is not necessary that a pixel block is a pixel region that a human being can actually recognize as a character. Examples of a "pixel block" include a part of character or a pixel region which does not form a character, so long as a pixel block has any block of pixels.

Moreover, the expressions "predetermined" and "set in advance (beforehand)" refers to that something is set before target processing. These expressions are used as a meaning including not only that something is set before processing of the exemplary embodiments starts but also that something is set after the processing of the exemplary embodiments started according to situation and state at that time or situation and state until then so long as it is before target processing.

FIGS. 2A to 2C are explanatory views illustrating examples of image compression.

An image 200 shown in FIG. 2A is an image to be read by a scanner. The image 200 contains a red character image and a natural image, such as a photograph.

When the compression described in the "background" section is performed for the image 200, the image 200 becomes a character image portion 210 shown in FIG. 2B and a background image 220 shown in FIG. 2C.

The character image portion 210 has a character image 211 and a character image attribute 212. Lossless compression, such as MMR, has been performed for the character image 211. Also, the character image attribute 212, which is configured to have a color of the character image 211 and coordinates indicating where the character image 211 is located in the background image 220, is added to the character image 211. Lossy compression, such as JPEG compression, has been performed for the background image 220.

When such processing is to be performed, a color of a peripheral portion of a character in the image 200 may be changed (discolored) due to influences of (i) the deterioration of an MTF and (ii) the JPEG compression performed immediately after scanning, as shown in the examples of FIGS. 3A and 3B. For example, when a character image, such as an original image 300 shown in FIG. 3A, is read with a scanner and the JPEG compression is performed for the obtained image data, discolored image data 310 shown in FIG. 3B is obtained. The discolored image data 310 is formed of a peripheral portion 320 which is discolored and a center portion 380 in which the discoloration is relatively smaller than in the peripheral portion 320.

There is a technique of extracting the color of the original image 300 from the discolored image data 310. For example, there is a character color extracting method using a clustering technique as described in JP 2004-128880 A, JP 2000-357230 A and JP Hei. 5-62013 A. In this method, RGB values of pixels which form a character are plotted on the RGB space (see FIG. 4A), they are classified into clusters by clustering processing, and an average color or a main color is calculated for each cluster and is then set as a character color. The plotted marks having a round shape in FIG. 4A corresponds to the center portion 380 in the discolored image data 310 shown in FIG. 4B (which is the same one as FIG. 3B), and the plotted marks having an x shape corresponds to the peripheral portion 320 in the discolored image data 310.

It is difficult to remove discoloration of the character periphery, which is caused by the MTF deterioration resulted from reading with the scanner and/or the JPEG compression, from the average color or the main color for each cluster obtained by the character color extracting method.

Moreover, as techniques for removing the influences of discoloration in the character periphery, there are techniques shown in the following examples.
(1) On the assumption that pixels of a character periphery are discolored, at least one pixel is deleted by line thinning processing, and a character color is calculated from the remaining character pixels (see JP 2008-99149 A).
(2) Line thinning processing is performed for a character, a line image having a line width "1" in a trunk portion which is a center of the character is extracted, and a character color is calculated from pixels of the line image (see JP 2004-242075 A, JP Hei. 5-130426 A and JP 2007-249774 A).

In these techniques, however, the number of discolored pixels in the character periphery changes due to the MTF characteristics of a scanner and the like. Therefore, in these algorithms, the number of pixels deleted by the line thinning processing changes. Moreover, in the case of the technique of determining a character color in association with some parameters, such as a quantization value of hue and a threshold value of a histogram, it is necessary to redesign the parameters whenever a scanner is changed (see JP 2008-99149 A).

Moreover, in the case of a character having a small line width, there is information that is used to determine the character color in the character periphery. For this reason, the trunk portion of the character may be discolored, rather than the peripheral portion of the character, due to influences of the deterioration of the MTF and/or the JPEG compression. FIGS. 5A and 5B are explanatory views illustrating detailed examples of an image in which discoloration has occurred. FIG. 5A shows an example of character image data 500 which is obtained by reading with the scanner, and FIG. 5B shows an example of character image data 510 which is obtained by enlarging the character image data 500. It can be seen that the character image data 510 includes a peripheral portion 520 which is less influenced by discoloration and a center portion 530 which is more influenced by the discoloration than the peripheral portion 520. Also, FIG. 5C shows a region 540 which is an example of an enlarged view of a part of the character image data 510. Each of the peripheral portion 520 and the center portion 530 has one pixel width, and such discoloration may occur in the character having a small line width. In this case, if a character color is determined only based on the center portion 530, a color of the discolored center portion 530 is adopted like a character image 600 for color extraction as shown in FIG. 6.

Originally, discoloration in a peripheral portion of a character due to MTF deterioration resulted from reading with the scanner, JPEG compression, and the like occurs when a peripheral portion of a character becomes moderate, as can be seen from a density profile of a character shown in FIG. 7. FIG. 7 is an explanatory view illustrating an example of change in pixel value which is caused by reading with a scanner. A pre-scan character pixel value 710 represents an original character color (a fixed pixel value is shown), and a density profile of a character after reading with the scanner becomes a post-scan character pixel values 720. It can be seen that discoloration occurs in the peripheral portion where the post-scan character pixel values 720 are different from the pre-scan character pixel value 710. A slope and a width of the moderate portion change in accordance with differences of scanners in resolutions, MTFs, and the like. In the case of resolution of 200 dpi (dot per inch) at which a normal document is read, the moderate slope is fixed for each scanner, and the width for this case is experientially less than one pixel. Also, when a resolution of the scanner is set to a high resolution, this one pixel may be enlarged.

Figure 8:
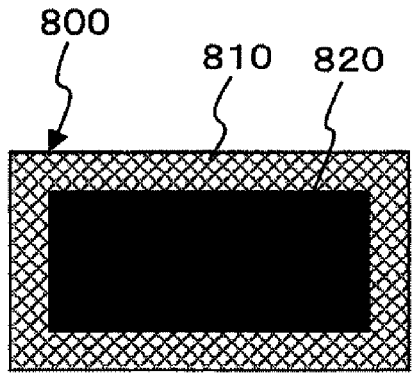
FIG. 8 is an explanatory view illustrating an example of calculation of a character color.

Then, when the original character color is calculated, an average value (P2) of pixels of the whole character (the peripheral portion 810 and the center portion 820) which is target image data 800, an average value (P1) of pixels of a region inside the character which is the center portion 820, and a ratio (r) that is set in advance are used to calculate a character color with considering the both information, as shown in FIG. 8. For example, expression (1) is used.

$$\text{Character color} = r \times P1 + (1-r) \times P2 \qquad (1)$$

where $0 < r < 1$.

When the scanner is not changed (including not only the case where the same scanner is used but also the case where another scanner having the equivalent characteristic is used), the same ratio r can be applied to any character. When the scanner is changed (when another scanner having a different characteristic is used), only the ratio r may be changed. Therefore, the ratio r set in advance is used for a target image, and the ratio r is changed when the cause of character discoloration changes.

Also, the ratio r may be changed according to a character size. For example, the ratio r may be increased when the character size is large, and may be decreased when the character size is small.

In addition, the ratio r may be calculated using the density profile. That is, in the density profile shown in FIG. 7, a ratio of (a) an integral value of pixel values (pixel values used to calculate P1) in the center portion of the character image and (b) an integral value of pixel values (pixel values used to calculate P2) of the whole character image may be calculated based on the post-scan character pixel values 720 in which the pixel values of the character has changed due to the MTF. Also, the ratio r may be calculated based on colorimetric data obtained by a colorimeter.

Hereinafter, various exemplary embodiments suitable for realizing the invention will be described with reference to the accompanying drawings.

FIG. 1 is a view illustrating the conceptual module configuration in the configuration example of a first exemplary embodiment.

Also, the term "module" generally means logically a separable component, such as software (computer program) and hardware. Therefore, the module in the exemplary embodiments indicates not only a module in a computer program but also a module in the hardware configuration. Thus, description on the exemplary embodiments also serve as explanations on a computer program, a system, and a method are also made. In addition, the terms "store", "cause something to store", and words equivalent thereto are used for the convenience of explanation. These words mean storing in a storage device or making a control to store in a storage device in the case where the exemplary embodiments are implemented by a computer program. Also, the "module" corresponds to a function in almost one-to-one manner. However, at the time of implementation, one module may be realized using one program or plural modules may be realized using one program, Alternatively, one module may be realized using plural programs. In addition, plural modules may be executed by one computer, or one module may be executed by plural computers in a distribution or parallel environment. Also, other modules may be included in one module. Also, the term "connection" is used not only for physical connection but also for logical connection (for example, transmission and reception of data, instruction, and reference relationship between data).

Also, a system or an apparatus may be realized by connecting plural computers, hardware, devices, and the like to each other through a communication tool, such as a network (including communication connection of one-to-one correspondence), or may be realized using one computer, hardware, a device, and the like. The term "apparatus" and the term "system" are used as synonymous terms.

An image processing apparatus of the first exemplary embodiment calculates a color of an original character image. The image processing apparatus of the first exemplary embodiment has a binarization module 110, a character outer periphery determining module 120, and a character color calculating module 130 as shown in FIG. 1.

The binarization module 110 is connected to the character outer periphery determining module 120. The binarization module 110 receives character color image data 151 and binarizes the character color image data 151. Then, the binarization module 110 transmits a binary image data 152 to the character outer periphery determining module 120. The binarization performed may be any one so long as it can extract character image data.

The character outer periphery determining module 120 is connected to the binarization module 110 and the character color calculating module 130. The character outer periphery determining module 120 determines as to whether or not each pixel of the image data binarized by the binarization module 110 forms a peripheral portion of a character image in the binary image data 152 binarized by the binarization module 110. Then, the character outer periphery determining module 120 transmits the determination result 153 to the character color calculating module 130. Examples of the determination result 153 include a three or more-valued label image which distinguishes a background, an outer periphery pixel, and the inside of a character from each other.

The character color calculating module 130 is connected to the character outer periphery determining module 120. The character color calculating module 130 calculates a character color 155 (that is, a pixel value) of the character image based on (i) pixel values of pixels (the center portion in the character image) which are determined by the character outer periphery determining module 120 not to form the peripheral portion and (ii) the pixel values of pixels forming the character image (its central and peripheral portions). For example, the character color calculating module 130 calculates the pixel value of the character image based on (i) an average value of the pixel values of the pixels, which are determined by the character outer periphery determining module 120 not to form the peripheral portion of the character image, (ii) an average value of the pixel values of the pixels forming the character image, and (iii) a character color calculation ratio 154 which is set in advance and indicates a ratio of the average values. For example, the above expression (1) is used. The character color calculation ratio 154 indicates which region and how much will be adopted in the calculation of the character color. The character color calculation ratio 154 may be determined as described above (see the explanation on the ratio r). Also, the character color calculating module 130 determines, based on the detection result 153, as to (i) whether or not each pixel of the character color image data 151 forms the center portion of the character image and (ii) whether or not each pixel of the character color image data 151 forms the character image, extract pixel values of the respective pixels from the character color image data 151 and calculates (i) the average value of the pixel values of the pixels forming the center portion of the character image and (ii) the average value of the pixel values of the pixels forming the entire character image.

Figure 9:
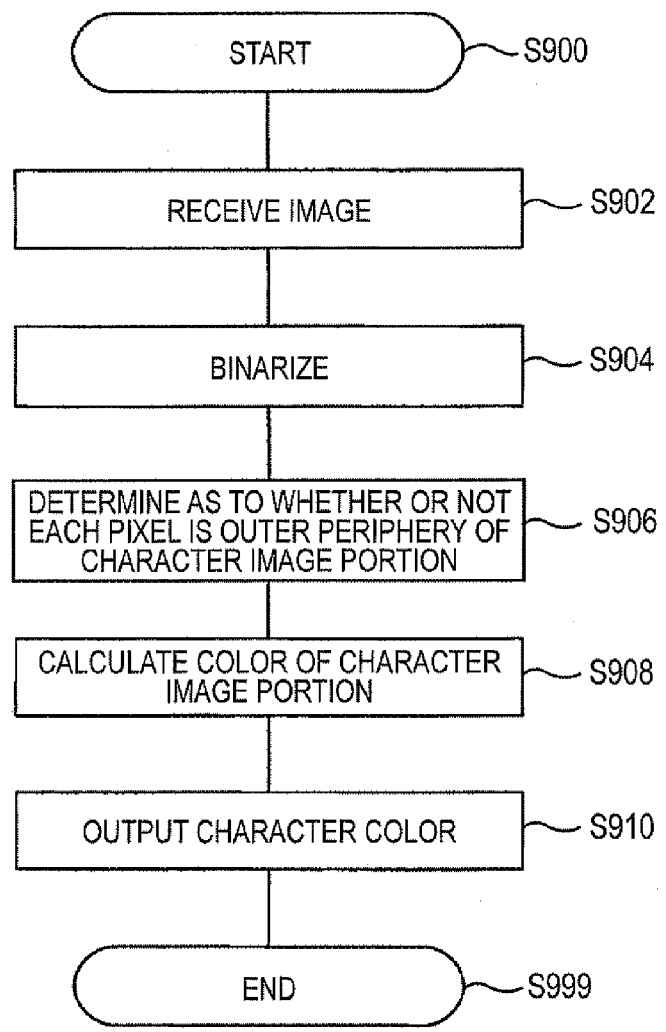
FIG. 9 is a flow chart illustrating an example of processing according to the first exemplary embodiment.

FIG. 9 is a flow chart illustrating an example of processing in the first exemplary embodiment.

In step S902, the binarization module 110 receives the character color image data 151.

In step S904, the binarization module 110 binarizes the received character color image data 151.

In step S906, the character outer periphery determining module 120 determines whether or not each pixel of the binarized image data 152 forms the outer periphery of the character image.

In step S908, the character color calculating module 130 calculates the character color based on the pixel values of the pixels forming the center portion of the character image, the pixel values of the pixels forming the whole character image, and the ratio.

In step S910, the character color calculating module 130 outputs the character color 155.

Next, a second exemplary embodiment will be described.

Figure 10:
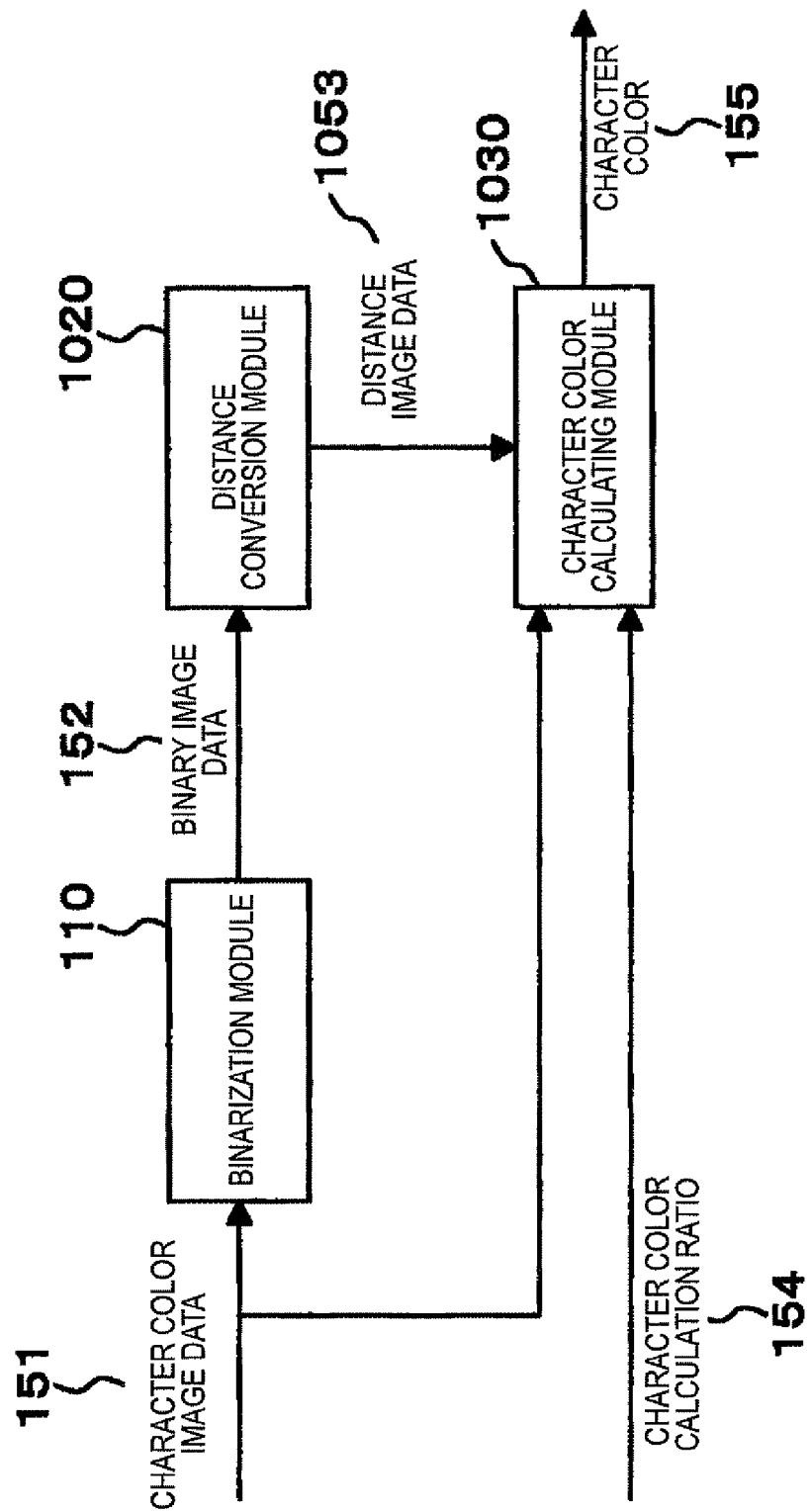
FIG. 10 is a view illustrating the conceptual module configuration a second exemplary embodiment.

FIG. 10 is a view illustrating the conceptual module configuration of the second exemplary embodiment. The second exemplary embodiment is more specific than the first exemplary embodiment. Also, the same components as those in the first exemplary embodiment are designated by the same reference numerals, and a repeated explanation thereon will be omitted.

The second exemplary embodiment has the binarization module 110, a distance conversion module 1020, and a character color calculating module 1030 as shown in FIG. 10.

The distance conversion module 1020 is connected to the binarization module 110 and the character color calculating module 1030. The distance conversion module 1020 is configured more specifically than the character outer periphery determining module 120 shown in FIG. 1. The distance conversion module 1020 determines as to whether or not each pixel of the binary image data 152 forms a peripheral portion of the character image based on a distance between each pixel of the binary image data 152 and a background of the character image in the binary image data 152. Examples of the "background" include pixels having the value "0" and a non-image portion.

Figure 11:
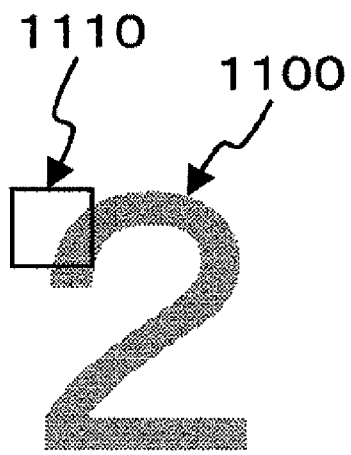
FIG. 11 is an explanatory view illustrating an example of a target character image.
Figure 12:
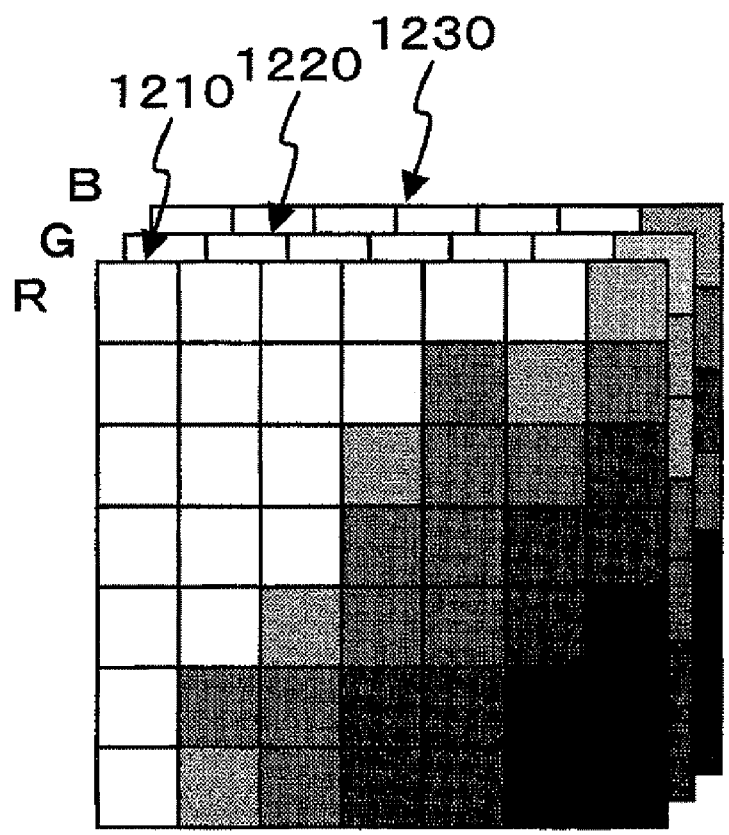
FIG. 12 is an explanatory view illustrating examples of R, G, and B images of a character image.
Figure 13:
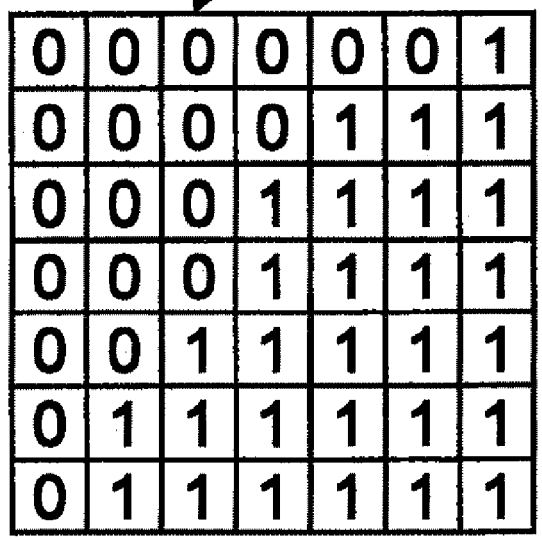
FIG. 13 is an explanatory view illustrating an example of a binary image.

Here, the processing example in the second exemplary embodiment will be described using a character image 1100 shown in FIG. 11 as an example. The binarization module 110 receives the character color image data 151 including the character image 1100. The character color image data 151 is an image expressed with RGB. For example, as shown in FIG. 11, RGB of a target region 1110 of the character image 1100 are configured of R image data 1210, G image data 1220, and B image data 1230 shown in FIG. 12. The binarization module 110 binarizes each of these image data. FIG. 13 shows an example of the image data (binary image data 1300) obtained by binarizing the R image data 1210.

Figure 14:
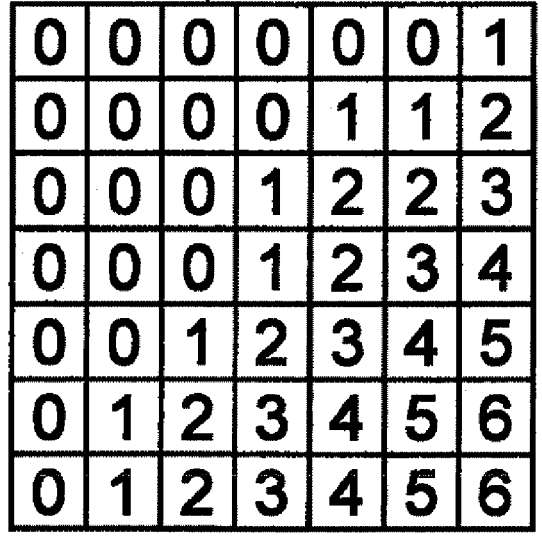
FIG. 14 is an explanatory view illustrating an example of a distance image.

The distance conversion module 1020 performs distance conversion processing for the binary image data 152. In the distance conversion processing, the distance conversion module 1020 generates distance image data 1400 showing how far the pixel of "1" in the binary image data 1300 is from the pixel "0", as shown in FIG. 14. More specifically, the distance conversion processing counts a distance (the number of pixels) between each pixel of the binary image data 1300 and the pixel of "0" while performing scanning. In the example shown in FIG. 14, it is assumed that the distance is the four neighborhood distance. However, the eight neighborhood distance may be used.

Figure 15:
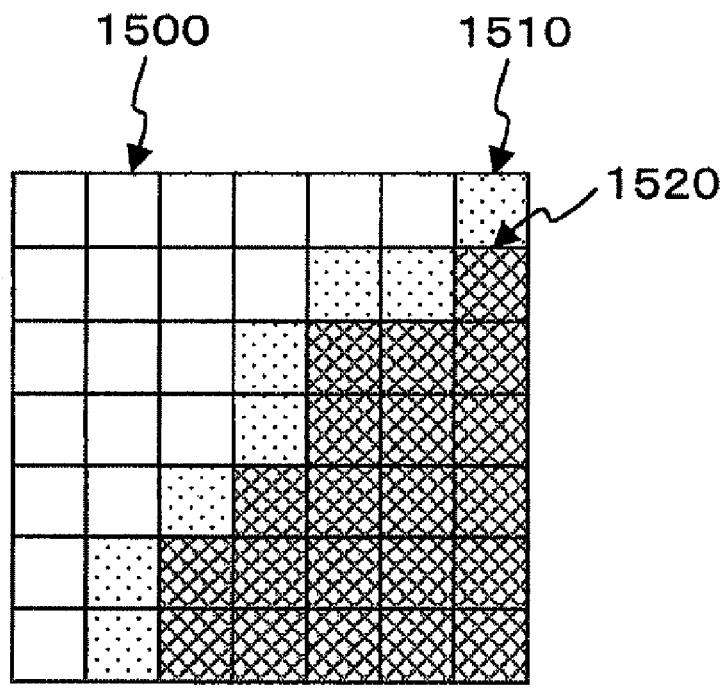
FIG. 15 is an explanatory view illustrating an example of extraction of a character color in the second exemplary embodiment.

The character color calculating module 1030 calculates (i) an average value of pixel values of pixels corresponding to pixels having a distance value of "1" or more (pixels of the whole character image; in the example shown in FIG. 15, a peripheral portion 1510 (pixels in which dots are drawn) and a center portion 1520 (hatched pixel)) and (ii) an average value of pixel values of pixels corresponding to pixels having a distance value of "2" or more (pixels existing in the center portion of the character image; in the example shown in FIG. 15, the center portion 1520), for each of RGB with reference to the distance image data 1053. Then, the character color calculating module 1030 calculates the character color 155 using the character color calculation ratio 154 and the average values. For example, the above expression (1) is used.

Next, a third exemplary embodiment will be described.

Figure 16:
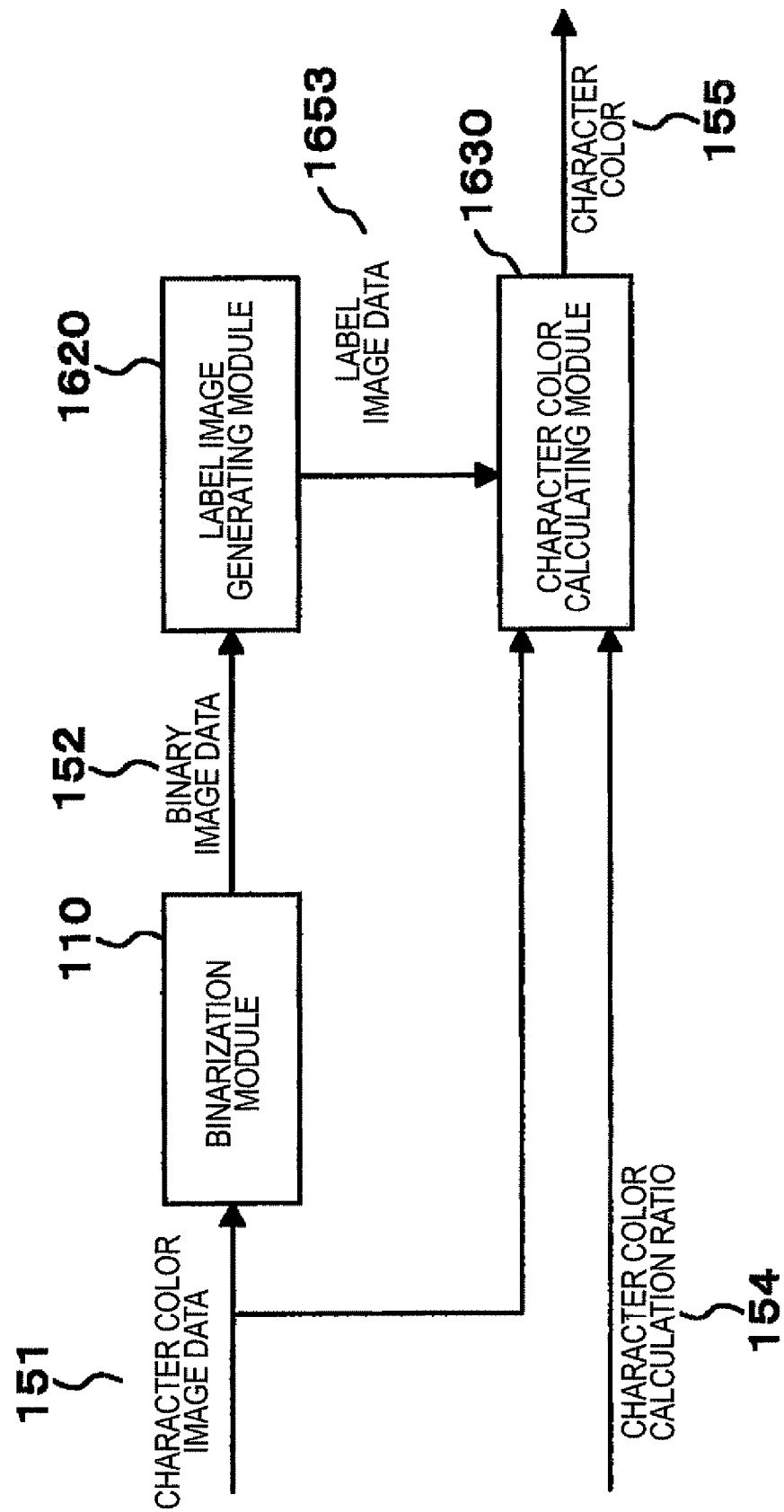
FIG. 16 is a view illustrating the conceptual module configuration of a third exemplary embodiment.

FIG. 16 is a view illustrating the conceptual module configuration of the third exemplary embodiment. The third exemplary embodiment is more specific than the first exemplary embodiment. Moreover, the same components as those in the first exemplary embodiment are designated by the same reference numerals, and a repeated explanation thereof will be omitted.

The third exemplary embodiment has the binarization module 110, a label image generating module 1620, and a character color calculating module 1630 as shown in FIG. 16.

The label image generating module 1620 is connected to the binarization module 110 and the character color calculating module 1630. The label image generating module 1620 is formed more specifically than the character outer periphery determining module 120 shown in FIG. 1. The label image generating module 1620 determines as to whether or not each pixel of the binary image data 152 forms a peripheral portion of a character image in the binary image data 152 by detecting a boundary between the character image and a background image.

Here, processing example in the third exemplary embodiment will be described using the character image 1100 shown in FIG. 11 as an example. Similar to the processing performed in the second exemplary embodiment, the binarization module 110 receives the character color image data 151 including the character image 1100 and binarizes the R image data 1210, the G image data 1220, and the B image data 1230 shown in FIG. 12. For example, the R image data 1210 is converted into the binary image 1300 shown in FIG. 13.

Figure 17:
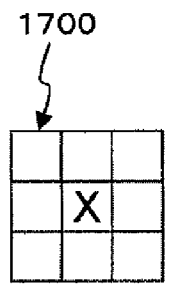
FIG. 17 is an explanatory view illustrating an example of a window.
Figure 18:
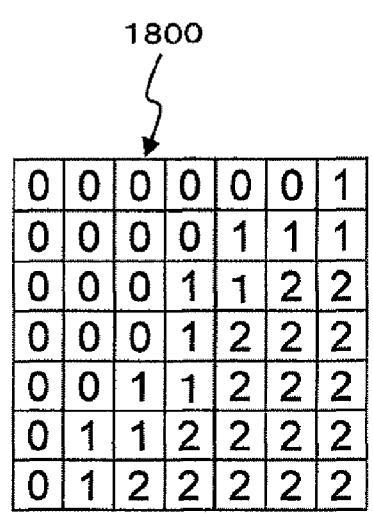
FIG. 18 is an explanatory view illustrating an example of an image after labeling processing.

The label image generating module 1620 performs labeling processing for the binary image data 152. The label image generating module 1620 performs the labeling processing using a window 1700 shown in FIG. 17. That is, like a label 1800 shown in FIG. 18, with using the window 1700 of 3×3, if a pixel in interest (pixel at a position having the symbol "x" in the window 1700) forms a background, the label image generating module 1620 gives a label value "0"; if the pixel in interest is a pixel of the character image and if at least one pixel of the background exists in the window, the label image generating module 1620 determines that the pixel in interest forms a peripheral portion of the character image and gives a label value "1"; and if the pixel in interest is a pixel of the character image and if no pixel of the background is in the window, the label image generating module 1620 determines that the pixel in interest forms an inside of the character image and gives a label value "2".

Figure 19:
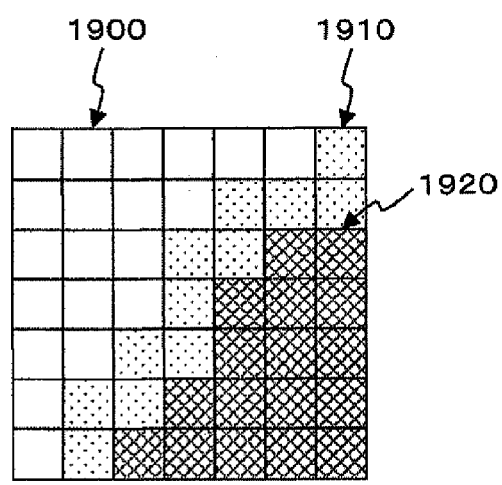
FIG. 19 is an explanatory view illustrating an example of extraction of a character color in a third exemplary embodiment.

The character color calculating module 1630 calculates (i) an average value of pixels corresponding to pixels having the label value of "1" or more (pixels of the whole character image; in the example shown in FIG. 19, a peripheral portion 1910 (pixels in which dots are drawn) and a center portion 1920 (hatched pixel)) and (ii) an average value of pixels corresponding to pixels having the label value of "2" (pixels existing in the center portion of the character image; in the example shown in FIG. 19, the center portion 1920), for each RGB with reference to label image data 1653. Then, the character color calculation module 1630 calculates the character color 155 using the character color calculation ratio 154 and the average values. For example, the above expression (1) is used.

Here, if the peripheral portion of the character image does not have one pixel width but has a two pixel width, the window size may be set to 5×5. That is, the window size may be changed according to the resolution of a scanner.

Figure 20:
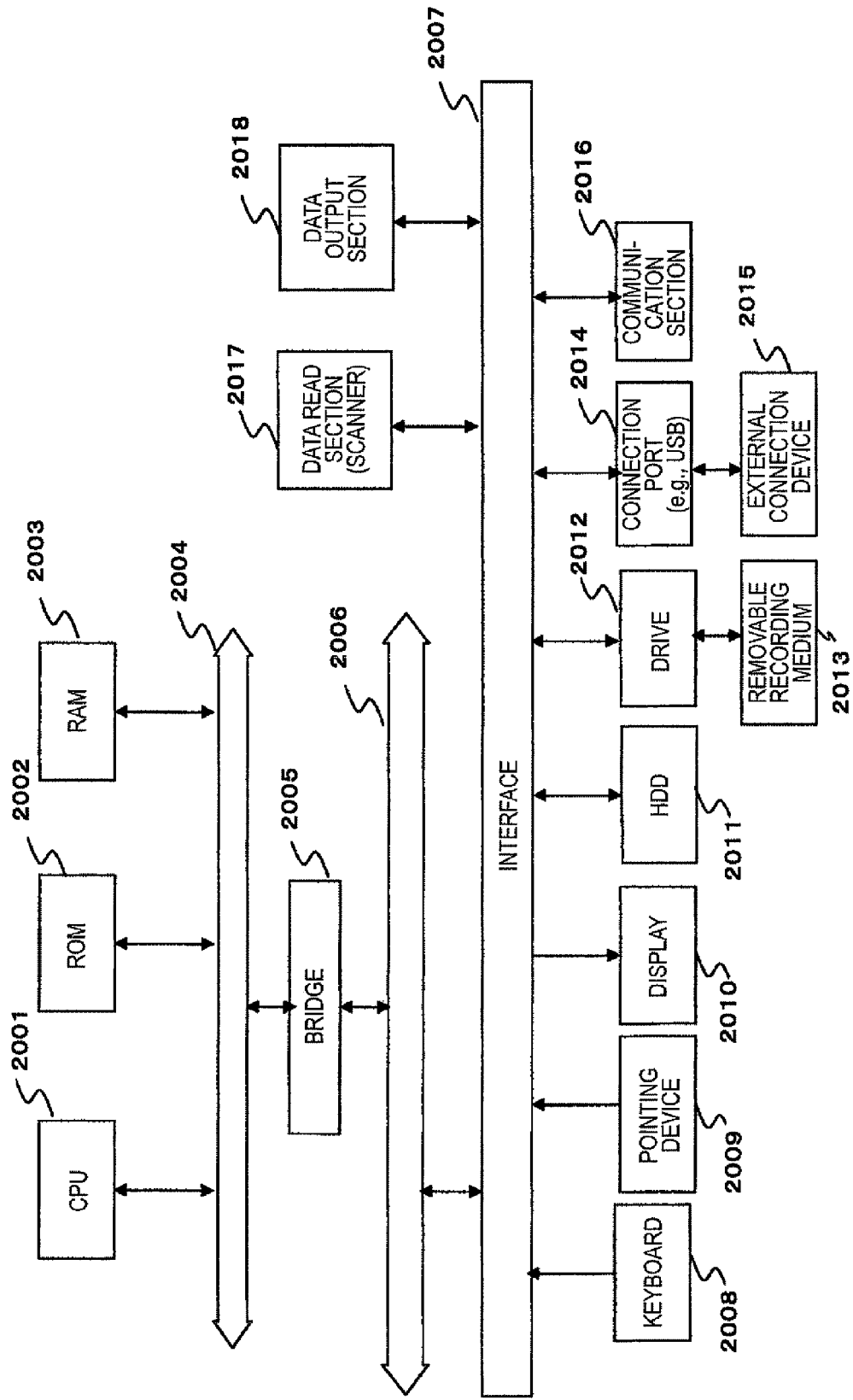
FIG. 20 is a block diagram illustrating an example of the hardware configuration of a computer for realizing the first to third exemplary embodiments.

Referring to FIG. 20, an example of the hardware configuration of the image processing apparatus of the above embodiment will be described. The configuration shown in FIG. 20 is formed by a personal computer (PC) and the like, for example. Here, an example of the hardware configuration is shown including a data read section 2017, such as a scanner, and a data output section 2018, such as a printer.

A CPU (central processing unit) 2001 is a control unit that executes processing according to the computer program in which the execution sequences of each of the various modules described in the above embodiment, that is, the binarization module 110, the character outer periphery determining module 120, the character color calculating module 130, the distance conversion module 1020, and the label image generating module 1620 are written.

A ROM (read only memory) 2002 stores a program, a computation parameter, and the like that the CPU 2001 use. A RAM (random access memory) 2003 stores a program used at the time of execution of the CPU 2001, a parameter that appropriately changes in the execution, and the like. These are connected to each other by a host bus 2004, such as a CPU bus.

The host bus 2004 is connected to an external bus 2006, such as a PCI (peripheral component interconnect/interface) bus, through a bridge 2005.

A keyboard 2008 and a pointing device 2009, such as a mouse, are input devices operated by an operator. A display 2010 is a liquid crystal display or a CRT (cathode ray tube) and serves to display various kinds of information as a text or image information.

An HDD (hard disk drive) 2011 includes a hard disk therein, drives the hard disk, and records or reproduces a program or information executed by the CPU 2001. A received image, a binary image, result data of determined character color, and the like are stored in the hard disk. In addition, various computer programs, such as various kinds of other data processing programs, are stored.

A drive 2012 reads data or a program recorded in a mounted removable recording medium 2013, such as a magnetic disk, an optical disk, a magneto-optic disk, or a semiconductor memory, and transmits the read data or program to the RAM 2003 connected thereto through an interface 2007, the external bus 2006, the bridge 2005, and the host bus 2004. The removable recording medium 2013 may also be used as the same data recording area as the hard disk.

A connection port 2014 is a port connected to an external connection device 2015 and has connecting portions, such as USB and IEEE 1394. The connection port 2014 is connected to the CPU 2001 and the like through the interface 2007, the external bus 2006, the bridge 2005, the host bus 2004, and the like. A communication section 2016 is connected to the network and executes processing for data communication with the outside. The data read section 2017 is a scanner, for example, and executes document reading processing. The data output section 2018 is a printer, for example, and executes document data output processing.

In addition, the hardware configuration of the image processing apparatus shown in FIG. 20 is only one example of the configuration. The above-described embodiment is not limited to the configuration shown in FIG. 20 but may be a configuration in which the modules described in the embodiment can be executed. For example, some of the modules may be formed by using dedicated hardware (for example, application specific integrated circuit (ASIC)). In addition, some of the modules may be provided in an external system connected through a communication line. Alternatively, a plurality of systems shown in FIG. 20 may be connected to each other through a communication line so as to perform a cooperative operation. Moreover, the modules may be included in a copying machine, a facsimile, a scanner, a printer, a complex machine (image processing apparatus having two or more functions of a scanner, a printer, a copying machine, and a facsimiles, and the like.

In addition, although the above explanation has been made using the expression, examples of the expression include those equivalent to the expression. The equivalent ones include changing the expression so as not to have an effect on the final result and solving the expression with algorithmic solution, other than the expression itself.

In addition, the program described above may be provided in a state where the program is stored in a recording medium or the program may be provided through a communication unit. In this case, the program may be regarded as the invention of a 'computer-readable recording medium in which a program is recorded', for example.

The 'computer-readable recording medium in which a program is recorded' refers to a recording medium that can be read by a computer recorded with a program, which is used for installation, execution, distribution, and the like of the program.

In addition, examples of recording media include: in association with the digital versatile disk (DVD), 'DVD-R, DVD-RW, DVD-RAM, and the like' that are standards established by the DVD forum and 'DVD+R, DVD+RW, and the like' that are standards established by the DVD+RW forum; in association with the compact disk (CD), a read only memory (CD-ROM), a CD recordable (CD-R), and a CD rewritable (CD-RW), and the like; a Blu-ray disc (registered trademark); a magneto-optic disk (MO); a flexible disk (FD); a magnetic tape; a hard disk; a read only memory (ROM); an electrically erasable and programmable read only memory (EEPROM); a flash memory; and a random access memory (RAM).

In addition, the program or a part of the program may be stored or distributed in a state where the program or the part of the program is recorded in the recording media. In addition, the program may be transmitted through communication, for example, through a wireline network such as a local area network (LAN), a metropolitan area network (MAN), a wide area network (WAN), Internet, an intranet, and an extranet or through a wireless communication network. Alternatively, the program may be transmitted through a transmission medium obtained by combination of those described above or may be carried on a carrier.

Moreover, the program may be a part of another program or may be recorded on a recording medium together with a separate program. In addition, the program may be separated to be recorded in a plurality of recording mediums. In addition, the program may be recorded in any kind of format including compression, encryption, and the like as long as the program can be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a binarization unit that binarizes image data;
a determination unit that determines as to whether or not each pixel of the image data binarized by the binarization unit forms a peripheral portion of a pixel block; and
a pixel value calculating unit that calculates a corrected pixel value of the pixel block based on (i) pixel values of pixels which are determined by the determination unit not to form the peripheral portion of the pixel block and (ii) pixel values of pixels forming the pixel block.

2. The image processing apparatus according to claim 1, wherein the determination unit determines as to whether or not each pixel of the image data binarized by the binarization unit forms the peripheral portion of the pixel block based on a distance between each pixel and a background.

3. The image processing apparatus according to claim 1, wherein the determination unit determines as to whether or not each pixel of the image data binarized by the binarization unit forms the peripheral portion of the pixel block by detecting a boundary between the pixel block and background image data.

4. The image processing apparatus according to claim 1, wherein the pixel value calculating unit calculates the corrected pixel value of the pixel block based on (i) an average value of the pixel values of the pixels which are determined by the determination unit not to form the peripheral portion of the pixel block, (ii) an average value of the pixel values of the pixels forming the pixel block, and a predetermined value indicating a ratio between the average values.

5. The image processing apparatus according to claim 2, wherein the pixel value calculating unit calculates the corrected pixel value of the pixel block based on (i) an average value of the pixel values of the pixels which are determined by the determination unit not to form the peripheral portion of the pixel block, (ii) an average value of the pixel values of the pixels forming the pixel block, and a predetermined value indicating a ratio between the average values.

6. The image processing apparatus according to claim 3, wherein the pixel value calculating unit calculates the corrected pixel value of the pixel block based on (i) an average value of the pixel values of the pixels which are determined by the determination unit not to form the peripheral portion of the pixel block, (ii) an average value of the pixel values of the pixels forming the pixel block, and a predetermined value indicating a ratio between the average values.

7. An image processing method comprising:
  binarizing image data;
  determining as to whether or not each pixel of the binarized image data forms a peripheral portion of a pixel block; and
  calculating a corrected pixel value of the pixel block based on (i) pixel values of pixels which are determined not to form the peripheral portion of the pixel block and (ii) pixel values of pixels forming the pixel block.

8. The image processing method according to claim 7, wherein the determining determines as to whether or not each pixel of the binarized image data forms the peripheral portion of the pixel block based on a distance between each pixel and a background.

9. The image processing method according to claim 7, wherein the determining determines as to whether or not each pixel of the binarized image data forms the peripheral portion of the pixel block by detecting a boundary between the pixel block and background image data.

10. The image processing method according to claim 7, wherein the calculating calculates the corrected pixel value of the pixel block based on (i) an average value of the pixel values of the pixels which are determined not to form the peripheral portion of the pixel block, (ii) an average value of the pixel values of the pixels forming the pixel block, and a predetermined value indicating a ratio between the average values.

11. A computer-readable medium storing a program that causes a computer to execute image processing, the image processing comprising:
  binarizing image data;
  determining as to whether or not each pixel of the binarized image data forms a peripheral portion of a pixel block; and
  calculating a corrected pixel value of the pixel block based on (i) pixel values of pixels which are determined not to form the peripheral portion of the pixel block and (ii) pixel values of pixels forming the pixel block.

12. The computer-readable medium according to claim 11, wherein the determining determines as to whether or not each pixel of the binarized image data forms the peripheral portion of the pixel block based on a distance between each pixel and a background.

13. The computer-readable medium according to claim 11, wherein the determining determines as to whether or not each pixel of the binarized image data forms the peripheral portion of the pixel block by detecting a boundary between the pixel block and background image data.

14. The computer-readable medium according to claim 11, wherein the calculating calculates the corrected pixel value of the pixel block based on (i) an average value of the pixel values of the pixels which are determined not to form the peripheral portion of the pixel block, (ii) an average value of the pixel values of the pixels forming the pixel block, and a predetermined value indicating a ratio between the average values.

* * * * *